March 29, 1966 K. E. SUNDSTROM 3,242,797
RATIO-RECORDING SPECTROPHOTOMETER
Filed Oct. 1, 1962 3 Sheets-Sheet 1

INVENTOR.
KARL ERIK SUNDSTROM
BY Robert J. Steinmeyer
ATTORNEY

March 29, 1966   K. E. SUNDSTROM   3,242,797
RATIO-RECORDING SPECTROPHOTOMETER
Filed Oct. 1, 1962   3 Sheets-Sheet 3

INVENTOR.
KARL ERIK SUNDSTROM
BY
ATTORNEY

United States Patent Office 3,242,797
Patented Mar. 29, 1966

3,242,797
RATIO-RECORDING SPECTROPHOTOMETER
Karl Erik Sundstrom, La Habra, Calif., assignor to Beckman Instruments, Inc., a corporation of California
Filed Oct. 1, 1962, Ser. No. 227,254
14 Claims. (Cl. 88—14)

The present invention relates to spectrophotometers, and more particularly relates to a ratio-recording spectrophotometer suitable for use in each of the ultra-violet, visible and infrared regions of the spectrum.

In double beam spectrophotometers, a beam of radiation from a source or from the exit slit of a monochromator is separated into two identical optical paths, the first passing through a suitable cell containing a reference material and the second passing through a similar cell containing a sample material. The radiation from the two channels is thereafter combined onto one detector whose output voltage is amplified. In ratio recording spectrophotometers, the output from the amplifier is separated into two signal channels, the first being supplied with signals corresponding to the optical signals produced in the reference path and the second being supplied with signals corresponding to the optical signals produced in the sample path. Signal storage devices are provided in each channel and the stored signals are fed to a servo amplifier which controls a servo motor which in turn controls a device for balancing the two inputs to the servo amplifier, for example, the wiper of a potentiometer connected across the storage device in the reference channel. The servo motor also drives the pen of a suitable recorder whose chart is driven in synchronism with the wave length scanning system of the monochromator so that a plot of a sample characteristic, for example, transmittance, against wavelength is obtained.

In order to be able to compute the ratio between reference and sample transmittance or other characteristic, it is necessary to devise an optical coding system and a corresponding electronic decoding system that permit the information about transmittance in two separate optical channels, reference and sample, to be combined on one detector, amplified in one amplifier and separated into two electronic channels without cross-talk between the reference and sample channel information, and yet fulfill a complete set of practical requirements such as cost, reliability, accuracy and simplicity. If cross-talk is introduced at the detector stage, separation of the signals becomes quite difficult. Various types of detectors, particularly those used for infrared work such as lead sulfide cells and thermocouples, are slow in reacting to changes in radiation impinging on them and thus give rise to very serious cross-talk problems. For this reason, commercial double beam spectrophotometers intended for use in the infrared region have been of the optical null variety.

In this type device, a comb or similar radiation attenuating device has been inserted in the reference beam, and the detector output fed to a comparator amplifier which senses a difference in intensity of the two beams alternately impinging upon the detector. The amplifier output controls a servo motor which in turn varies the attenuation of the reference beam in response to the amplifier output, until the transmittance in each beam is equal. The servo motor also drives a recorder pen of the same type and for the same purpose described previously. The difficulty in obtaining precise enough attenuators together with other inherent problems in an optical null system such as maintaining a sufficient energy level at the detector, makes this system generally undersirable for most applications. The art has therefore long sought a ratio-recording system that could overcome the problems raised by slow detectors and thus be used in the infrared region.

According to the present invention, a ratio-recording spectrophotometer is provided which substantially reduces the effect of cross-talk between the reference and sample information, and thus is suitable for use with a slow detectors in the infrared region, while still being satisfactory for use with the faster detectors used in the visible and ultraviolet regions. For this purpose, the present invention utilizes several circuit features which individually are sufficient in some circumstances to reduce cross-talk to a permissible level but which, for best results, are preferably used in conjunction. The first novel feature comprises a signal separation system which, when used with a proper demodulation sequence, cancels out in large measure the cross-talk components in the sample and reference pulses together with the undesired effects of large signal transients. The second novel feature utilizes a feedback circuit and a modulator operating off the information in the signal channels to produce a signal equal to and opposite the output of the radiation detector, and thus permit only small error signals to be passed through the amplifier and sorted into the sample and reference channels. This feedback arrangement causes a large portion of the cross-talk error to be eliminated, and, particularly when used with the signal separation system of the present invention, provides a ratio-recording spectrophotometer which is completely satisfactory for use in all useful spectral regions, including the infrared. The system is relatively simple, has high reliability and accuracy and satisfies all other requirements of conventional ratio-recording devices.

It is therefore a primary object of the present invention to provide a ratio-recording spectrophotometer suitable for use in the all useful regions of the spectrum, including the infrared.

It is another object of the present invention to provide a signal separation system which minimizes cross-talk effects on the separated signals.

It is also an object of the present invention to provide a double beam spectrophotometer employing a feedback system to produce signals in opposition to the output of the radiation detector.

It is a further object of the present invention to provide a ratio-recording spectrophotometer in which only small error signals are passed through the signal separation system.

It is a still further object of the present invention to provide a ratio-recording spectrophotometer having a feedback system so that only small error signals pass through the signal separation system, and a signal separation system for minimizing cross-talk between the signals.

These and further objects and advantages of the invention will become more apparent upon reference to the following specification and claims and appended drawings wherein:

Figure 1:
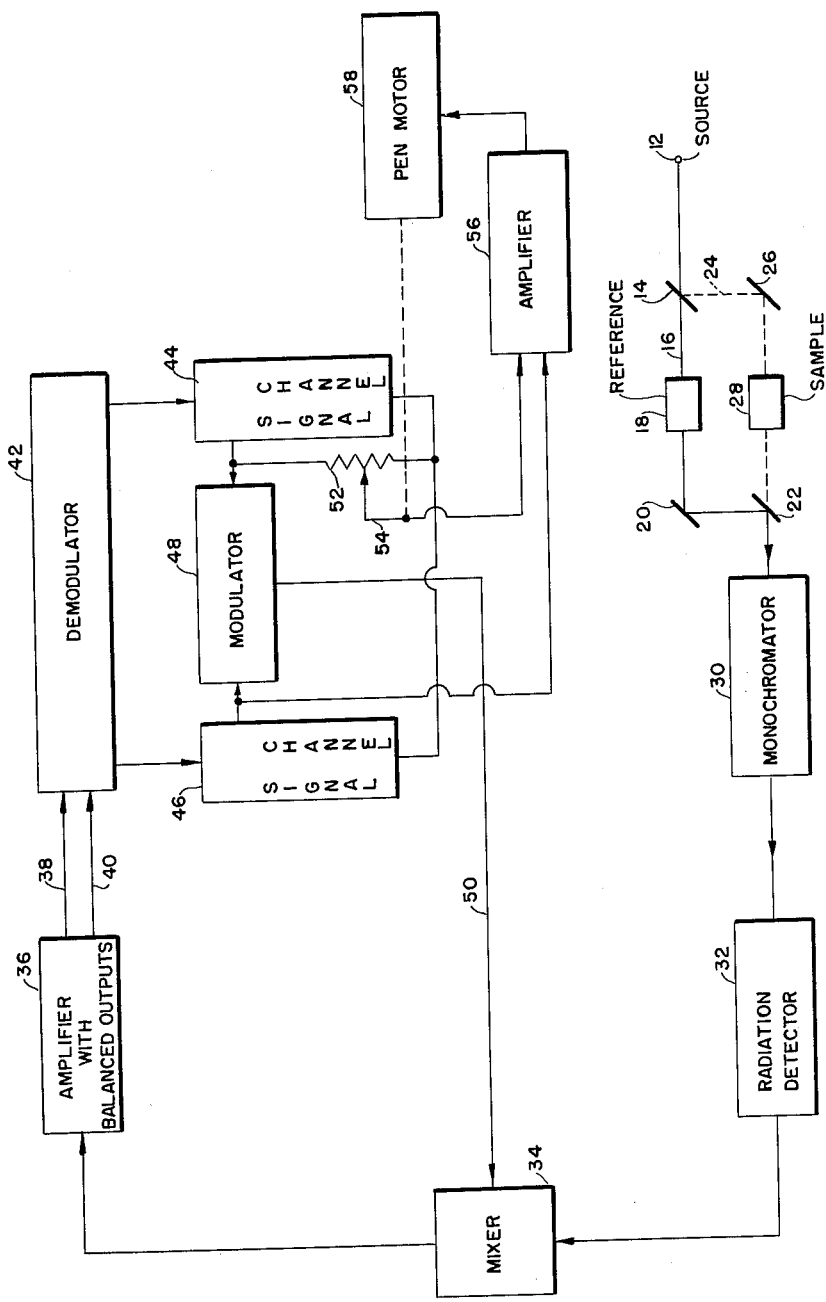
FIG. 1 is a block diagram of the spectrophotometer of the present invention.

Referring now to FIG. 1, there is shown a general schematic diagram of the spectrophotometer of the present invention. A beam of radiation from a suitable source 12, such as a Nernst glower, is directed onto a beam splitter 14 such as a rotating sector mirror which alternately directs a first beam of radiation 16 through a reference material 18 to a stationary mirror 20 and thence to a beam combiner 22, and a second beam of radiation 24 to a stationary mirror 26 and thence through a sample material 28 to the beam combiner. If the rotating mirror 14 is of the type having four quadrants arranged to pass the beam, block the beam, reflect the beam and block the beam, the output from the beam combiner will consist of a series of pulses separated by blank spaces, each alternate pulse having a magnitude corresponding to the transmittance of the reference material and the other pulses having a magnitude corresponding to the transmittance of the sample material.

The pulse train is then passed through a monochromator 30, for example of the type disclosed in U.S. Patent #2,948,185, issued on August 9, 1960, to W. M. Ward et al. and assigned to the assignee of the present invention. The pulse train leaving the exit slit of the monochromator 30 is then directed onto a radiation detector 32 of any conventional type such as a thermocouple. The detector 32 converts the input radiation pulses to a series of electrical pulses having the same general wave form as the radiation pulse train. The output of the detector 32 is connected to one input of a mixer 34 of any suitable conventional design. The output of the mixer 34 is connected to an amplifier 36 having balanced outputs 38 and 40, i.e., equal in magnitude but opposite in polarity. These outputs are coupled to a demodulator 42 which has a pair of outputs connected to signal information storage channels 44 and 46. The channel 44 serves as a reference signal channel and the channel 46 serves as a sample signal channel, the demodulator 42 acting to direct the various pulses from the amplifier 36 to the proper signal channel. The signals stored in the channels 44 and 46 are periodically sampled by a modulator 48 whose output is fed by a feedback circuit 50 to another input of the mixer 34. The signals thus fed back act to oppose the signals from the radiation detector 32 so that only an error signal is passed to the input of amplifier 36.

A potentiometer 52 is connected across the output of the signal channel 44 and has a wiper arm 54 which is connected to one input of a servo amplifier 56. The other input of the servo amplifier 56 is connected to the output lead from the signal channel 46. The output of the servo amplifier 56 controls the operation of a pen servo motor 58 which drives the wiper arm 54 to balance the inputs to the servo amplifier 56 and also controls the movement of a pen across a suitable recording chart in the conventional manner.

In the operation of this system, it can be seen that the use of a proper demodulating sequence will enable the demodulator 42 to short the reference signals in the amplifier output into the channel 44 where they are stored, and to sort the sample signals into the channel 46 where they are stored. Similarly, by means of a proper modulating sequence, the modulator 48 can cause a signal to be fed back along the feedback circuit 50 that is equal to and opposite the radiation detector output. This sequence, of course, consists in connecting the channel 44 to the feedback circuit 50 at the same time and for the same duration as a reference radiation pulse is impinging on the radiation detector 32, and connecting the channel 46 to the feedback circuit 50 at the same time and for the same duration as a sample radiation pulse is impinging on the detector 32.

The output from the mixer 34 is thus the difference between the magnitude of a pulse from the radiation detector and the signal stored in one of the signal channels. This error signal is the only signal that passes through amplifier 36 and signal separating system. When the operation of the system is initiated, there are, of course, no signals stored in the channels 44 and 46 so the error signals are very large and the stored signals rapidly come up to a value approaching the detected signals. However, once the stored signals have reached this value, the error signal passing through amplifier 36 has a magnitude equal only to the magnitude of the signal from the radiation detector times the inverse of the amplifier gain. The signals stored in the channels 44 and 46 thus never differ from the input signals by more than this error signal which is very small as a high gain amplifier is used. The pen servo motor is thus very closely controlled to respond to the output signal from the radiation detector, and in fact, for all practical purposes, follows it exactly, as the unavoidable noise in the system is usually at a higher level than the error signal. This system thus provides a great improvement over prior art systems where the entire signal from the detector is amplified and separated.

Since only error signals are separated, the effects of cross-talk between signals are greatly reduced and thus greater accuracy achieved. In other proposed systems using detectors such as thermocouples, the cross-talk component of a sample signal may be at least as much as 10% of its total magnitude. As this signal is established in its full magnitude on its respective signal channel, the record made will be almost meaningless. In the present system, only the error signals are separated, so a 10% error in the detector signal would only show up in the signal channel as 10% divided by the gain of amplifier 36. The feedback system thus greatly reduces the effects of cross-talk between reference and sample signals.

The effects of cross-talk are further reduced by the use of a balanced output amplifier 36 and proper demodulating sequence. Since there are two amplifier outputs, equal to magnitude but opposite in polarity, it is possible, with proper demodulation, to impress portions from each of the outputs on the signal channels in such a manner that any extraneous components of the signals, such as cross-talk or transient caused drifts in the amplifier output, are substantially canceled out. If this is done, it will not be necessary to later relate the signals in the signal channels to a common reference, and thus one of the more difficult problems in signal separation system design will have been bypassed. A demodulation sequence suitable for this purpose will be explained hereinbelow in connection with FIG. 3.

Figure 2:
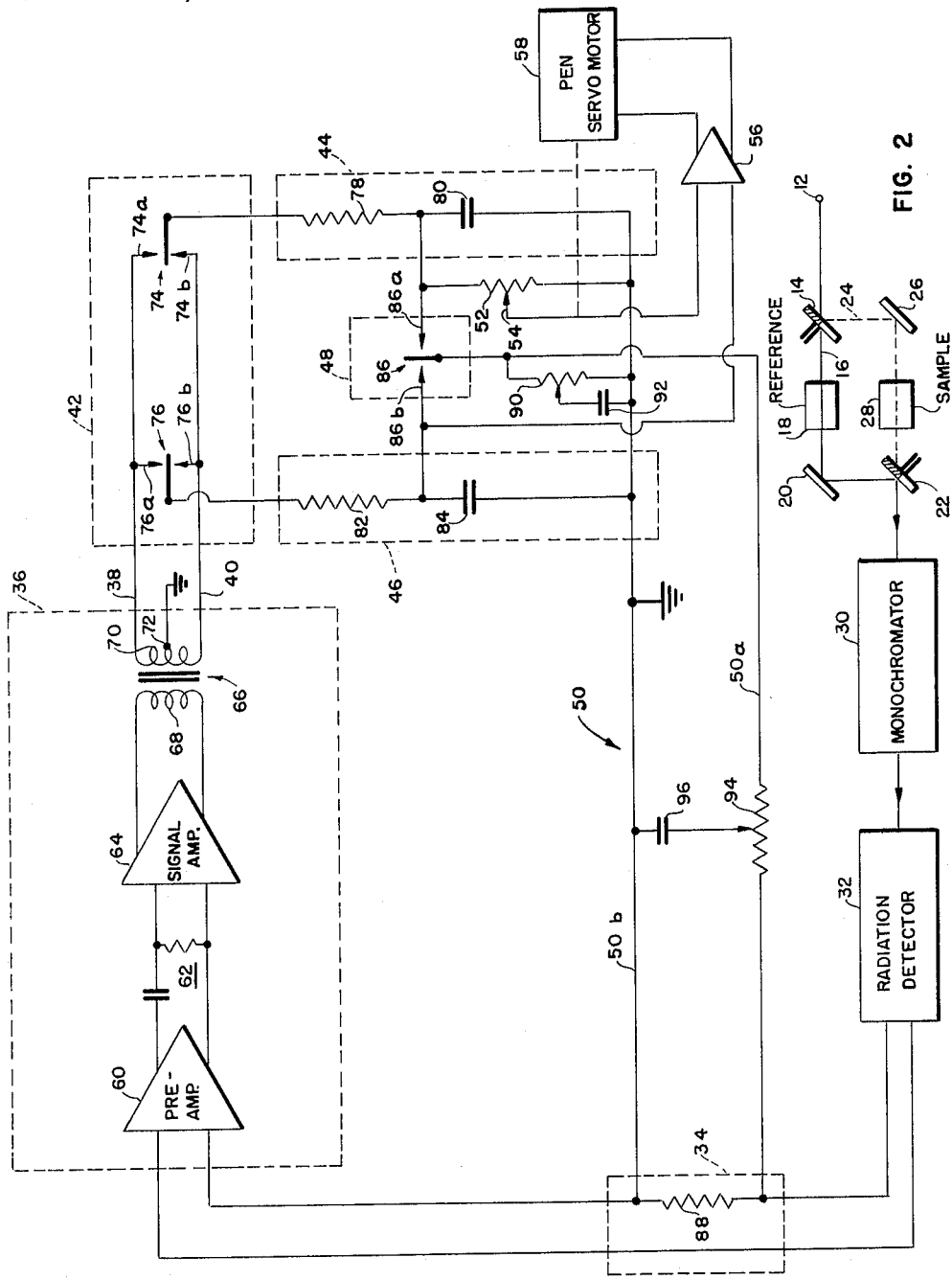
FIG. 2 is a schematic diagram of a preferred embodiment of the present invention.

A preferred specific embodiment of the present invention is illustrated in FIG. 2, and will be explained in connection with FIG. 3, which shows the preferred demodulation and modulation sequences. In considering this embodiment, it should be understood that although time separation is used as the method of coding and decoding the signals, any other suitable method such as frequency separation, time and frequency separation, phase separation or phase and frequency separation could equally well be used. In coding the optical system for time separation of signals, the beam splitter 14 is preferably a rotating sector mirror having reflective and transmissive quadrants separated by opaque quadrants, and the beam combiner 22 is a rotating mirror half reflective and half transmissive. Such an optical system will cause an optical waveform having a reference pulse, a blank pulse, a sample pulse and a blank pulse to fall on the radiation detector 32. Such a waveform is shown at (a) in FIG. 3.

The signals generated by the radiation on the radiation detector 32 are fed through the mixer 34 to the amplifier 36. In this embodiment, this amplifier consists of a pre-amplifier 60, a differentiating circuit 62, and a main amplifier 64 across which is connected an output transformer 66 having a primary winding 68 and a secondary winding 70, the center tap 72 of which is grounded. The differentiating circuit 62 is not necessary to this invention but it is sometimes helpful in compensating for distortions introduced in the detector, which in some cases acts as an ideal detector followed by an integrator. In any event, the output from the pre-amp 60 is passed to the main amplifier 64 where it is further amplified. An output circuit of this type causes the output signal of the amplifier 64 to appear at either end of the secondary winding 70 with a phase difference of 180°. The waveform illustrated in FIG. 3g shown by the solid lines appears on output line 38 and the waveform shown by the dashed lines appears on output line 40. With a grounded center tapped transformer output configuration as illustrated in FIG. 2 the waveforms will equalize about circuit ground as illustrated in FIG. 3g. The voltage waveform appearing on output line 40 is equal to but opposite that appearing on line 38.

The output lines 38 and 40 are coupled to the demodulator 42 which in the embodiment of FIG. 2 comprises a pair of switches 74 and 76 each having a moving contact and a pair of stationary contacts 74a, 74b and 76a, 76b, respectively. The stationary contacts 74a and 76a are connected to the output line 38 while the stationary contacts 74b and 76b are connected to the output line 40. The movable contact of the switch 74 is connected to the reference signal channel 44 and the movable contact of the switch 76 is connected to the sample channel 46. These movable contacts may be driven in any suitable manner, such as by mounting cams on the rotating shaft driving the mirror 14. The sequence of operation of these switches is shown at (b), (c) and (d) of FIG. 3, and will be described hereinafter. It should be understood that other suitable demodulation schemes may be used, for example, a slip ring and commutator system or a photosensitive device and optical mask system.

The reference signal channel 44 comprises a resistor 78 and a capacitor 80 connected in series, the junction point between them being connected to a stationary contact 86a of a switch 86 which makes upon the modulator 48. The sample signal channel 46 comprises a resistor 82 and a capacitor 84 connected in series, their junction point being connected to the stationary contact 86b of the switch 86. The movable contact of the switch 86 is connected to one side 50a of the feedback circuit 50, while the other side 50b of the feedback circuit is connected to the junction of the capacitors 80 and 84.

The feedback circuit 50 is fed to the mixer 34 which may simply be a resistor 88 connected in the line from the detector to amplifier 36, the lines 50a and 50b being connected to impress a signal on this resistor approximately equal to but opposite the signal generated by the detector, thus cancelling it out. It should be understood that a specific mixer is not necessary; the feedback signal can be coupled directly to modify detector or amplifier operation. The signal fed back, of course, depends on the sequence of operation of the movable contact 86 as it is connected to the reference and sample channels. Normally, the feedback signals will take the form of square pulses; however, it may sometimes be desirable to shape these pulses to more accurately reflect the pulses generated by the detector.

For this purpose, wave shaping networks are provided in the feedback path. These may conveniently be composed of resistance-capacitance networks such as those shown at 90, 92, and 94, 96. The resistances 90 and 94 are adjustable to vary the R–C time constants of these circuits.

Figure 3:
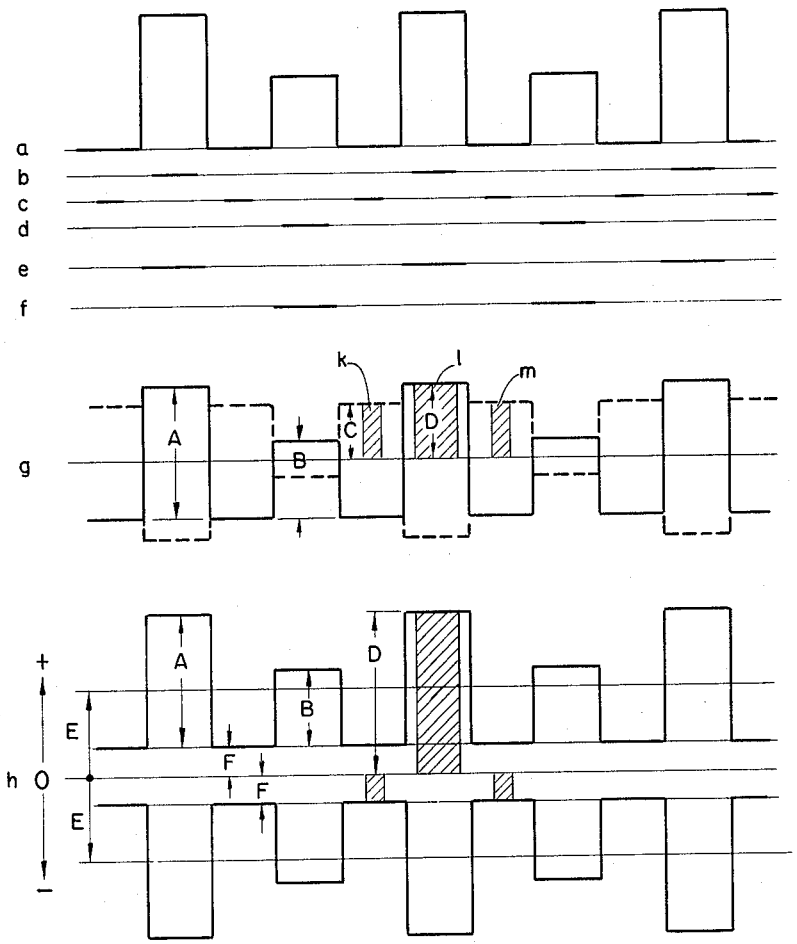
FIG. 3 illustrates the preferred timing sequences of the demodulator and modulator of the present invention, together with an idealized waveform of the demodulator input.

Referring now to FIG. 3, the demodulation and modulation sequences of the various switches are shown, together with the waveforms with respect to circuit ground appearing at the output lines 38 and 40. In this figure, a line indicates that a switch is closed, while a blank space indicates that it is open; thus at (c), switch contact 74b is in engagement with the moving contact of switch 74, for a short time $t$ during each blank pulse, while the moving contact is in engagement with contact 74a for a time twice as long in duration or $2t$ during a reference pulse as shown at (b). Similarly, the moving contact of switch 76 is in engagement with the stationary contact 76b for the same duration $t$ of each blank pulse, also shown at (c), and in engagement with the stationary contact 76a for a time $2t$ during each sample pulse, as shown at (d). The interval $t$, may, for example, be 30° with $2t$ then being 60°. The modulation sequence shown at (e) and (f) illustrates, respectively, that the moving contact of the switch 86 is in engagement with the stationary contact 86a during the time the reference radiation pulse is falling on the detector so that the information in the reference channel is fed back to the mixer during this time, and is in engagement with the contact 86b during the time that the sample radiation pulse is falling on the detector so that sample information is fed back at this time.

Referring again to FIG. 3g which illustrates the idealized waveform of the signals appearing at the output of amplifier 36, let it be assumed that the system has been in operation a sufficient time for the capacitors 80 and 84 to be charged to the value approximating the magnitude of the reference and sample pulses, so that only a small error signal passes through amplifier 36. As previously explained, the balanced output circuit of amplifier 36 results in oppositely phased signals appearing at the ends of the secondary winding 70 of the transformer 66. Normally, when the various signal levels are relatively constant, these waveforms will fluctuate around ground potential because of the grounded center tap 72 of the secondary winding 70 such that the sum of the areas of the reference and sample signal pulses above and below ground potential are equal.

It is desirable to determine the true ratio of the sample pulse to the reference pulse. To accomplish this it is necessary to determine the absolute magnitude of the reference pulse having a value A in the waveform of FIG. 3g, to determine the absolute value of the sample pulse having an amplitude B and to store these values across capacitors 80 and 84, respectively. The demodulation scheme of the present invention provides these absolute magnitudes across the respective capacitors and will be explanied with respect to what occurs during the reference pulses.

Shortly before the reference pulse appears on output lines 38 and 40, the moving contact of the switch 74 engages the stationary contact 74b, thus connecting the output line 40 to the integrating circuit including the capacitor 80. The voltage on line 40 at this time is of a positive magnitude C, causing capacitor 80 to charge with respect to ground for the period of time $t$ during which the switch is closed. The amount of charge accumulated on capacitor 80 during the time $t$ is represented by the cross-hatched section $k$. The integrating circuit 44 including capacitor 80 is next connected to the line 38 when the moving contact engages contact 74a during the reference pulse. A voltage of magnitude D is thus impressed across capacitor 80 for a time $2t$ causing it to charge, the amount of charge accumulated on the capacitor during this period being represented by the cross-hatch section 1 of the reference pulse. The next coupling period for the integrating circuit 44 is again during the blanking pulse for a time $t$, so that capacitor 80 again accumulates a charge represented by the cross-hatched section $m$.

Thus, during one demodulation cycle, capacitor 80 accumulates a charge having a value of $2tC+2tD$ or $2t(C+D)$. Since the output signals on lines 38 and 40 are equal and oppositely phased it is apparent that $C+D=A$. Therefore, the capacitor 80 accumulates a charge equal to $2tA$. The voltage accumulated on capacitor 80 is thus directly related to the height A of the reference pulse over the blanking level or the absolute magnitude of the pulse. The same operation takes place in the sample signal channel so that the voltage stored on capacitor 84 has a value directly related to the absolute magnitude B of the sample pulse. By applying voltages proportional to A and B to the input of servo amplifier 56, as hereinbefore explained, the true ratio of B to A can be recorded. The slight ripple caused by the continuous charging of the capacitors is insignificant because the feedback circuit limits the magnitude of the signals applied to the capacitors to a small portion of the total voltage across them.

FIG. 3h illustrates the operation of the system when the waveforms on lines 38 and 40 are displaced from circuit ground due to common mode signals or low frequency transient signals passing transformer 66. In FIG. 3h the positive waveform appears on line 38 and the negative waveform on line 40. Each of these waveforms are again centered about a D.C. average value E such that the sum of the areas of the reference and sample pulses above and below these D.C. values are equal. As illustrated, the output of amplifier 36 may not be zero during the dark interval, thus creating an offset potential F with respect to circuit ground. For the sake of simplicity this offset potential in FIG. 3h is indicated as being a steady state value, but generally will be a varying potential or a transient resulting from various factors within the system.

It is again desirable to compare the absolute magnitude A of the reference pulse with the absolute magnitude B of the sample pulse. In the past the presence of this offset potential F has made signal separation extremely difficult since the reference and sample signals must later be related to a common reference in order to take their ratio.

The balanced outputs and the demodulating system of the present invention enable the effect of this offset potential to be eliminated as may be seen from inspection of FIG. 3h. Since amplifier 36 has balanced outputs as shown, these output waveforms are offset from ground by equal but opposite amounts F. It is apparent from the demodulation scheme hereinbefore explained that during the reference pulse capacitor 80 accumulates a positive charge equal to $2tD$. However, since capacitor 80 is connected to line 40 for a time $t$ both before and after the reference pulse and since the potential on line 40 is negative with respect to ground, the capacitor is discharged during these periods and loses a charge equal to $2tF$. Thus, the net charge remaining on the capacitor 80 is $2t(D-F)$. It is apparent that A, the height of the reference pulse over the blanking level F, is $D-F$. Thus, if a positive charge is accumulated on the capacitor equal to $2tD$ and a negative charge is accumulated equal to $2tF$, the net charge remaining on the capacitor is $2tA$, and the voltage stored on capacitor 80 is directly related to the height A of the reference pulse. The same operation takes place in the sample signal channel so that the voltage stored on capacitor 84 is directly related to the value B regardless of the magnitude of the offset potential F.

The offset potential F need not be a steady state value as indicated in FIG. 3h to obtain benefit of this invention in that the sampling of the offset on either side of the pulse will provide a close approximation to the offset and thereby an extremely close approximation of the absolute value of the pulse height A.

The demodulation system of the present invention also greatly limits the effects of cross-talk between the signal channels in the same manner that the offset potential effects are eliminated. Since slow detector response results in each signal pulse having a component from the preceding signal pulse, a slight offset will also result whose effect will largely be canceled in the same manner as explained above. This feature of the present invention is particularly useful in reducing the effects of dynamic cross-talk.

It may be seen from the foregoing discussion that the feedback feature and the demodulating feature of the present invention complement each other in reducing cross-talk effects to a negligible factor in spectrophotometers employing detectors with slow response characteristics. The feedback system effectively eliminates the static and dynamic cross-talk by permitting only error signals to pass through the amplifier to the signal channels, while the demodulating scheme reducing the effects of dynamic cross-talk and offset potentials caused in the amplifier output by large changes in input signal level. It should also be recognized that the systems can be used independently in many applications, particularly those wherein fast detectors may be used or where a different scheme of signal coding and decoding is used. In the later connection, it should be understood that although time separation is disclosed, the other signal coding and decoding methods mentioned previously may be used, together with their associated circuitry, without departing from the spirit of the present invention.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. In a ratio-recording spectrophotometer, the combination comprising:
   optical modulating means for producing a first series of radiation pulses indicative of a characteristic of a reference material and a second series of radiation pulses indicative of the same characteristic of a sample material;
   radiation detector means for producing in response to said radiation pulses impinging thereon an electrical output signal having first and second series of pulses corresponding to said first and second series of radiation pulses;
   amplifier means coupled to said detector means for amplifying said output signal, said amplifier means having balanced outputs;
   a pair of signal information storage channels;
   demodulating means coupling said signal channels to said amplifier means, said demodulating means acting to periodically couple said channels to one or the other of said balanced outputs and decouple them therefrom in a manner whereby the pulses of said first series of said detector signal pass into the first of said channels and the pulses of the second series of said detector signal pass into the second of said channels; and
   means for periodically sampling the signal information stored in said channels and producing an electrical feedback signal proportional to said stored signal information to cancel at least a portion of said detector signal whereby only the difference between said feedback signal and said detector signal is amplified.

2. In a ratio-recording spectrophotometer, the combination comprising:
   optical modulating means for producing a first series of radiation pulses indicative of a characteristic of a reference material and a second series of radiation pulses indicative of the same characteristic of a sample material;
   radiation detector means for producing in response to said radiation pulses impinging thereon an electrical output signal having first and second series of pulses corresponding to said first and second series of radiation pulses;
   amplifier means coupled to said detector means for amplifying said output signal, said amplifier means having balanced outputs;
   a pair of signal information storage channels;
   demodulating means coupled to said balanced outputs and said signal channels for periodically coupling both of said signal channels to one of said balanced outputs and for alternately coupling said channels to the other of said balanced outputs whereby pulses of said first series of said detector signal are passed into one of said channels and pulses of said second series of said detector signal are passed into the other of said channels;

modulator means coupled to said signal channels for periodically sampling the signal information stored in said channels; and negative feedback means coupled to said modulator means for supplying a feedback signal proportional to said signal information in said channels to cancel at least a portion of said detector signal whereby only the difference between said feedback signal and said detector signal is amplified and supplied to said channels.

3. In a ratio-recording spectrophotometer, the combination comprising:

optical modulating means for producing a first series of radiation pulses indicative of a characteristic of a reference material and a second series of radiation pulses indicative of the same characteristic of the sample material;

radiation detector means for producing in response to said radiation pulses impinging thereon an electrical output signal having first and second series of pulses corresponding to said first and second series of radiation pulses;

amplifier means coupled to said detector means for amplifying said output signal;

output means coupled to said amplifier means for developing a pair of output signals corresponding to said amplifier output, one of said pair of output signals being of opposite phase to the other of said pair of output signals;

a pair of signal information storage channels;

demodulating means coupled to said signal channels and said output means for periodically coupling both of said signal channels to one of said pair of output signals and for alternately coupling said channels to the second of said pair of output signals whereby the pulses of said first series of said detector signal pass into the first of said channels and the pulses of said second series of said detector signal pass into the second of said channels;

modulator means coupled to said signal channels, said modulator means periodically sampling the signal information stored in said channels;

negative feedback means coupled to said modulator means for supplying a feedback signal proportional to said signal information in said channels to cancel at least a portion of said detector signal whereby only the difference between said feedback signal and said detector signal is amplified; and means for continuously monitoring the information in each of said channels and recording the ratio therebetween.

4. In a ratio-recording spectrophotometer, the combination comprising:

optical modulating means for producing a radiation pulse train having a first series of radiation pulses indicative of a characteristic of a reference material and a second series of radiation pulses indicative of the same characteristic of a sample material;

radiation detector means for converting said radiation pulse train into an electrical signal having first and second series of of pulses corresponding to said first and second series of radiation pulses;

amplifier means coupled to said detector means for amplifying said electrical signal;

output means coupled to said amplifier means for developing a pair of output signals corresponding to said electrical signal, one of said pair of output signals being of opposite phase to the other of said pair of output signals;

a pair of signal information storage channels;

a demodulator coupled to said output means and said signal channels, said demodulator acting to first couple both of said channels to one of said pair of output signals for a time $t$ during an interval of said one signal when pulses of neither series are present, then couple said first channel to the other of said pair of output signals for a time $2t$ during an interval of said other signal when a pulse of said first series is present, then again to couple both of said channels to said one of said pair of output signals for a time $t$ during a second interval of said one signal when pulses of neither series are present, and then to couple said second channel to said other of said pair of output signals for a time $2t$ during an interval of said other signal when a pulse of said second series is present; and modulator means coupled to said signal channels and having the same modulation cycle as said optical modulating means for periodically sampling the signal information in said channels;

negative feedback means coupled to said modulator means for supplying a feedback signal proportional to said signal information in said channels to cancel at least a portion of said detector signal whereby only the difference between said feedback signal and said detector signal is amplified and supplied to said channels; and means for continuously monitoring the signal information in each of said channels and recording the ratio therebetween.

5. In a ratio-recording spectrophotometer, the combination comprising:

optical modulating means for producing a first series of radiation pulses indicative of a characteristic of a reference material and a second series of radiation pulses indicative of the same characteristics of a sample material;

means for electrically detecting and amplifying said radiation signals whereby an electrical signal is formed having first and second series of pulses corresponding to said first and second series of radiation pulses;

a pair of signal information storage channels;

demodulating means coupling said signal channels to said detecting and amplifying means whereby pulses of said first series are passed into one of said channels and pulses of said second series are pased into the other of aid channels; and means for periodically sampling the signal information in said channels and feeding said sampled signal information back to said detecting and amplifying means to cancel at least a portion of the signal formed therein.

6. In a ratio-recording spectrophotometer, the combination comprising:

optical modulating means for producing radiation signals indicative of a characteristic of a sample material and of a reference material;

radiation detector means for converting said radiation signals into electrical signals;

amplifier means coupled to said detector means for amplifying said electrical signals;

a pair of signal information storage channels;

demodulating means coupling said signal channels to said amplifier means whereby signals indicative of the characteristic of the reference material are passed into one of said channels and signals indicative of the characteristic of the sample material are passed into the other of said signal channels;

modulator means, said modulator means periodically sampling the signal information in said signal channels whereby electrical signals proportional to the signal information in said channels are produced; and negative feedback circuit means coupled to the output of said modulator means and to the input circuit of said amplifier means, whereby only the difference between the output of said modulator means and said radiation detector means is amplified.

7. In a ratio-recording spectrophotometer, the combination comprising:

optical modulating means for producing a first series of radiation pulses indicative of a characteristic of a reference material and a second series of radiation pulses indicative of the same characteristic of a sample material;

radiation detector means for converting said radiation signals into an electrical signal having first and second series of pulses corresponding to said first and second series of radiation pulses;

amplifier means coupled to said detector means for amplifying said electrical signal;

a pair of signal information storage channels;

demodulating means coupling said signal channels to said amplifier means whereby pulses of said first series of said detector signal are passed into one of said channels and pulses of said second series of said detector signal are passed into the other of said channels so that one channel contains information relative to the characteristic of the reference material and the other channel contains information relative to the characteristic of the sample material;

modulator means coupled to said signal channels, said modulator means periodically sampling the signal information in said channels; and negative feedback means coupled to said modulator means for supplying a feedback signal proportional to the signal information in said channels to cancel at least a portion of said detector signal whereby only the difference between said feedback signal and said detector signal is amplified.

8. In a ratio-recording spectrophotometer, the combination comprising:

optical modulating means for producing a first series of radiation pulses indicative of a characteristic of a reference material and a second series of pulses indicative of the same characteristic of a sample material;

radiation detector means for converting said radiation pulses into an electrical signal having first and second series of pulses corresponding to said first and second series of radiation pulses;

amplifier means coupled to said detector means for amplifying said electrical signal;

a pair of signal information storage channels;

demodulating means periodically coupling said signal channels to said amplifier means to pass pulses of said first series of said detector signal into one of said signal channels and pulses of said second series of said detector signal into the other of said channels;

modulator means coupled to said signal channels, said modulator means acting in the same manner as said optical modulating means and periodically sampling the signal information in said channels to produce an electrical signal substantially equal to the signal information stored in said channels;

negative feedback means coupled to said modulator for supplying a feedback signal to cancel at least a portion of said detector signal whereby only the difference between said feedback signal and said detector signal is amplified and supplied to said channels; and means for continuously monitoring the signal information in each of said channels and recording the ratio between them.

9. In a ratio-recording spectrophotometer, the combination comprising:

optical modulating means for producing a first series of radiation pulses indicative of a characteristic of a reference material and a second series of radiation pulses indicative of the same characteristics of a sample material;

radiation detector means for converting said radiation pulses into an electrical signal having first and second series of pulses corresponding to said first and second series of radiation pulses;

amplifier means coupled to said detector means for amplifying said signal, said amplifier having balanced outputs;

a pair of signal information storage channels;

demodulator means coupled to said balanced outputs and said signal channels, said demodulator means acting to periodically couple said channels to one of said balanced outputs when pulses of neither of said first and second series are present and decouple them therefrom and to couple one of said channels to the other of said balanced outputs during pulses of said first series and the other of said channels to said other of said balanced outputs during pulses of said second series whereby the pulses of said first series of said detector signal pass into the first of said channels and the pulses of said second series of said detector signal pass into the second of said channels; and means for continuously monitoring the signal information in each of said channels and recording the ratio therebetween.

10. In a ratio-recording spectrophotometer, the combination comprising:

optical modulating means for producing a pulse train having a first series of radiation pulses indicative of a characteristic of a reference material and a second series of pulses indicative of the same characteristic of a sample material;

radiation detector means for converting said radiation signals into an electrical pulse train having first and second series of pulses corresponding to said first and second series of radiation pulses;

amplifier means coupled to said detector means for amplifying said electrical pulse train;

output means coupled to said amplifier means for developing a pair of output signals corresponding to said electrical pulse train, one of said pair of output signals being of opposite phase to the other of said pair of output signals;

a pair of signal information storage channels;

a demodulator coupled to said output means and said signal channels, said demodulator acting to first couple both of said channels to one of said pair of output signals for a time $t$ during an interval of said electrical pulse train when pulses of neither series are present, then couple said first channel to the other of said output signals for a time $2t$ during an interval of said electrical pulse train when a pulse of said first series is present, then again to couple both of said channels to said one output signal for a time $t$ during a second interval of said electrical pulse train when pulses of neither series are present, and then to couple said second channel to said other output signal for a time $2t$ during an interval of said electrical pulse train when a pulse of said second series is present; and means connected to said pair of signal information storage channels for continuously monitoring the signal information in each of said channels and recording the ratio therebetween.

11. In a system for sorting first and second series of pulses present in a common pulse train into first and second individual signal channels, the combination comprising:

an amplifier for amplifying said common pulse train;

output means coupled to said amplifier for developing a pair of output signals corresponding to said common pulse train, one of said signals being of opposite phase to the other of said signals;

a demodulator coupled across said output means for periodically coupling both of the individual signal channels to one of said pair of output signals and for alternately coupling the channels to the other of said pair of output signals to cause the pulses of said first series to pass into one of the channels and pulses of said second series to pass into the other of the channels.

12. In a system for sorting first and second series of pulses present in a common pulse train into individual signal channels, the combination comprising:
   amplifier means for amplifying said common pulse train;
   output means coupled to said amplifier means for developing a pair of output signals corresponding to said common pulse train, one of said pair of output signals being of opposite phase to the other of said pair of output signals;
   a pair of individual signal channels; and
   a demodulator coupled between said output means and said individual signal channels for coupling both of the individual signal channels to one of said pair of output signals for a time $t$ during an interval of said common pulse train when pulses of neither series are present, then coupling one of the signal channels to the other of said pair of output signals for a time $2t$ during an interval of said common pulse train when a pulse of said first series is present, then again coupling both of the individual signal channels to said one of said pair of output signals for a time $t$ during a second interval of said common pulse train when pulses of neither series are present, and then coupling the other one of the signal channels to said other of said pair of output signal for a time $2t$ during an interval of said common pulse train when a pulse of said second series is present.

13. In a ratio-recording spectrophotometer, the combination comprising:
   optical modulating means producing a radiation signal indicative of a characteristic of reference and sample materials;
   radiation detector means converting said radiation signal to a corresponding electrical signal:
   means coupled to said radiation detector means producing oppositely phased output signals each corresponding to said electrical signal;
   a pair of signal storage channels;
   signal separation means coupling said last named means to said pair of signal channels and periodically sampling said oppositely phased output signals whereby that portion of said electrical signal corrersponding to the characteristic of said reference material is stored in one of said pair of signal channels and that portion of said electrical signal corresponding to the characteristic of said sample material is stored in the other of said signal channels;
   means connecting said pair of signal channels to said radiation detector means including negative feedback means for feeding back a signal proportional to the signal information stored in said one signal channel in phase with that portion of said electrical signal corresponding to the characteristic of said reference material and a signal from the other of said pair of signal channels in phase with that portion of said electrical signal corresponding to the characteristic of said sample material whereby said electrical signal is an error signal representing the difference between the signal information stored in said signal channels and said radiation signal.

14. In a ratio recording spectrophotometer, the combination comprising:
   a source of radiant energy;
   optical modulating means producing reference and sample beams of radiant energy;
   radiation detector means positioned to receive said reference and sample beams and producing an electrical output signal having a first portion indicative of a characteristic of a reference material and a second portion indicative of the same characteristic of a sample material;
   amplifying means connected to said radiation detector means for amplifying said electrical signal;
   first electrical circuit means connected to said amplifying means for storing said first portion of said electrical signal;
   second electrical circuit means connected to said amplifying means for storing said second portion of said electrical signal;
   means connecting said first and second electrical circuit means to said radiation detector means for feeding back a signal proportional to the signal information stored in said first circuit means in phase with said first portion of said electrical signal and for feeding back from said second circuit means a signal proportional to the signal information stored in said second electciral circuit means in phase with said second portion of said electrical signal whereby the input to said amplifying means is an error signal indicative of the difference between the signal information stored in said first and second signal circuit means and said electrical signal.

References Cited by the Examiner

UNITED STATES PATENTS

| 2,761,350 | 9/1956 | Hornig | 88—14 |
| 2,980,861 | 5/1961 | Popowsky | 324—140 |
| 3,025,746 | 3/1962 | Cary et al. | 88—14 |
| 3,130,302 | 4/1964 | Liston et al. | 250—43.5 |

DAVID H. RUBIN, *Primary Examiner.*

JEWELL H. PEDERSEN, *Examiner.*

L. ORLOFF, R. L. WIBERT, *Assistant Examiners.*